United States Patent [19]

Martinez-Leon et al.

[11] Patent Number: 4,998,410

[45] Date of Patent: Mar. 12, 1991

[54] HYBRID STAGED COMBUSTION-EXPANDER TOPPING CYCLE ENGINE

[75] Inventors: Aurelio Martinez-Leon, Camarillo; Christopher M. Erickson, Thousand Oaks; Pei-Shiun Chen, No. Hollywood, all of Calif.

[73] Assignee: Rockwell International Corporation, El Segundo, Calif.

[21] Appl. No.: 403,278

[22] Filed: Sep. 5, 1989

[51] Int. Cl.$^5$ .............................................. F02K 9/46
[52] U.S. Cl. ...................................... 60/259; 60/260
[58] Field of Search ............... 60/259, 260, 258, 257

[56] References Cited

U.S. PATENT DOCUMENTS

| | | | |
|---|---|---|---|
| 3,028,729 | 4/1962 | Ledwith | 60/259 |
| 3,077,073 | 2/1963 | Kuhrt | 60/259 |
| 3,128,601 | 4/1964 | Abild | 60/259 |
| 3,170,295 | 2/1965 | Dryden | 60/259 |
| 3,623,329 | 11/1971 | Abild | 60/259 |
| 4,171,615 | 10/1979 | Stewart et al. | 60/259 |
| 4,220,001 | 9/1980 | Beichel | 60/259 |
| 4,771,600 | 9/1988 | Limerick et al. | 60/259 |
| 4,879,874 | 11/1989 | Koyari et al. | 60/259 |

FOREIGN PATENT DOCUMENTS 261652  11/1987  Japan ................................ 60/259

*Primary Examiner*—Donald E. Stout
*Attorney, Agent, or Firm*—H. Fredrick Hamann; Harry B. Field; Steven E. Kahm

[57] ABSTRACT

A thrust engine is disclosed in the form of a hybrid staged combustion-expander topping cycle engine. The engine comprises a mixed cycle, one cycle being an expander cycle (14) operating at low temperatures and the other being a staged combustion cycle (12) operating at a higher temperature. A portion of liquid hydrogen from a fuel pump (16) is passed in heat exchange relation with the engine nozzle (22) for cooling same and heating the hydrogen, and the heated hydrogen is passed to an oxidizer turbine (28) for driving a liquid oxygen pump (81). Another portion of the liquid hydrogen from the fuel pump is passed in heat exchange relation with the engine thrust chamber (21) and combustor (20), and a portion of the resulting heated hydrogen is introduced, together with a portion of the pressurized liquid oxygen from the liquid oxygen pump, into a preburner (20) for combustion therein, and passage of the combustion gasses to a fuel turbine (26) for driving the fuel pump. A portion of the liquid hydrogen discharged from heat exchange relation with the thrust chamber and combustor is introduced into the combustor, together with a portion of the liquid oxygen discharged from the liquid oxygen pump, for combustion and passage of the combustion gases to the thrust chamber and expansion in the nozzle. The combustion gases discharged from the fuel turbine are mixed with the hydrogen gases discharged from the oxidizer turbine, and such mixture is also introduced into the combustor.

12 Claims, 1 Drawing Sheet

HYBRID STAGED COMBUSTION-EXPANDER TOPPING CYCLE ENGINE

BACKGROUND OF THE INVENTION

1. Field of the Invention

This invention relates to thrust engine systems, and is particularly directed to a hybrid staged combustion-expander topping cycle engine.

2. Description of the Prior Art

In the thrust engine, basically a set of propellants is pumped through a combustor and burn therein to provide thrust. Some of these engines are known as gas generators and some are staged combustion cycle engines. Staged combustion cycle engines are very high chamber pressure engines providing a large thrust. Thus they operate at very high system pressure and very high system temperatures.

In a typical staged combustion cycle engine, both the fuel turbine and the oxidizer turbine are driven by preburners employing very high temperature gasses, of the order of 1900° R. In such fully staged combustion cycles there is thus employed two preburners, one for each of the respective turbines. The gasses discharged from the turbines are combined and are introduced at very high temperatures into the thrust chamber of the engine.

As between the gas generator cycle engine and the staged combustion engine, the latter is of higher performance. However, because of the high temperatures and pressures involved in the staged combustion engine and due to the presence of more components in such engines and high thermal stresses in the turbines, a greater potential for failure is present, thus reducing the reliability potential for such engines.

SUMMARY OF THE INVENTION

There is accordingly provided according to the present invention concept a mixed cycle engine, utilizing an expander cycle operating at relatively low temperatures and a staged combustion cycle operating at a higher temperature. Thus, the expander cycle is combined with the staged combustion cycle to gain greater reliability over the conventional staged combustion cycle engine without adversely affecting its performance to any substantial degree.

In the resulting hybrid cycle engines, according to one embodiment thereof, preburner gasses are fed directly to the fuel turbine of the staged combustion cycle without dilution of such gases, and according to another embodiment the preburner combustion gasses are diluted with gasses discharged from the oxidizer turbine of the expander cycle, prior to introduction of the preburner combustion gasses into the fuel turbine of the staged combustion cycle. In the case of the latter hybrid staged combustion topping cycle embodiment, preburner gas dilution is used to develop required turbine power in a moderate thrust engine system with turbine operating temperatures substantially lower, e.g. of the order of 1000° R, lower than those of the conventional staged combustion cycle.

To accomplish the cycle power balance at the lower temperatures, the main turbines of the expander cycle and the staged combustion cycle are run in series, with the low-power oxidizer turbine of the expander cycle upstream of the fuel turbine of the staged combustion cycle. A portion of the fuel, e.g. hydrogen, heated, e.g. to 600° R by passage initially through the nozzle coolant jacket of the thrust engine is used to drive the oxidizer turbine. Another portion of the hydrogen fuel, after passage in heat exchange relation with the engine thrust chamber and combustor, is passed to the preburner of the staged combustion cycle, where it is combusted with oxygen to increase the fuel turbine flow rate and to provide high temperature combustion gases, to the inlet of the fuel turbine. In the dilution embodiment the preburner combustion gasses are cooled through mixing with the oxidizer turbine exhaust hydrogen to obtain a lower temperature hydrogen-rich mixture, e.g. of about 900° R and of high enthalpy, before being introduced into the fuel turbine. The temperatures of the drive gasses are in all cases low enough to significantly reduce the thermal stresses and cooling requirements of the oxidizer turbine, fuel turbine and turbine exhaust collection manifolds.

OBJECTS OF THE INVENTION

It is accordingly one object of the present invention to provide an improved hybrid staged combustion-expander topping cycle engine.

Another object is to combine a staged combustion cycle engine with an expander cycle engine which operates with lower turbine temperatures.

A further object is the provision of an engine of the above type wherein the turbines operate at reduced temperatures without substantially reducing chamber pressures.

A still further object of the invention is the provision of a hybrid cycle engine of the above type having greater reliability and reduced thermal stresses as compared to the fully staged conventional combustion cycle engine, with performance only somewhat lower to moderately lower than the conventional staged combustion cycle engine.

DETAILED DESCRIPTION OF THE INVENTION AND PREFERRED EMBODIMENTS

Figure 1:
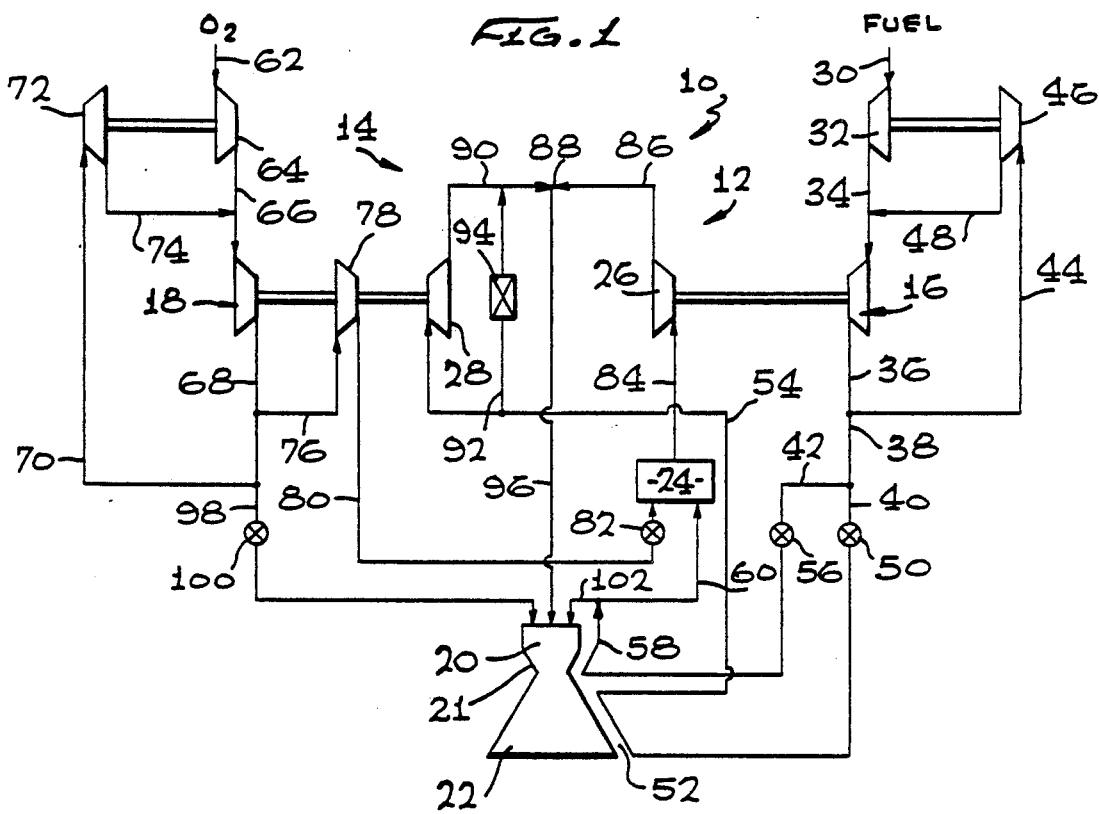
FIG. 1 is a schematic illustration of one embodiment of a hybrid staged combustion-expander topping cycle engine of the invention.

FIG. 1 of the drawing is directed to one embodiment of the invention directed to an expander/staged combustion hybrid cycle engine without preburner dilution, indicated at 10. The engine is comprised of a staged combustion cycle, indicated generally at 12, in combination with an expander topping cycle, indicated generally at 14. The staged combustion cycle 12 comprises a fuel pump 16 for pressurizing the fuel, hydrogen in the present embodiment, and the expander cycle 14 comprises an oxidizer pump 18 for pressurizing oxidizer, oxygen in the present embodiment to a high pressure. Thus, as described in greater detail hereinafter, hydrogen and oxygen are pressurized to a high pressure and are conducted to a combustor 20 for combustion therein to a high temperature, and the resulting combustion gasses are passed through an associated thrust chamber 21 and into a nozzle 22 for expansion therein to generate thrust power.

The staged combustion cycle 12 includes a fuel-rich preburner 24 to generate combustion gasses for the fuel turbine 26 which drives the fuel pump 16.

The expander topping cycle 14 includes an oxidizer or liquid oxygen turbine 28 driven by hydrogen gasses heated to a temperature lower than the temperature of the combustion gasses from the preburner 24, for driving the liquid oxygen pump 18.

More particularly, for driving the staged combustion cycle 12 of the engine, hydrogen fuel at 30 is introduced into a fuel boost pump 32 and the initially pressurized fuel is introduced via a conduit at 34 into the fuel pump 16. Pressurized liquid hydrogen at a pressure of 8380 psi is discharged at 36 from fuel pump 16 and the major portion of such hydrogen at 38 is divided into two streams 40 and 42. A minor portion of pressurized liquid hydrogen at 36 is by-passed at 44 to the inlet of a fuel boost pump turbine 46 for driving the fuel boost pump 32, and the expanded hydrogen at 48 is combined with the pressurized hydrogen discharged from the fuel boost pump at 34. As an alternative to the liquid hydrogen by-pass at 44, a gaseous hydrogen drive may be employed for the fuel boost pump turbine 46.

The stream of liquid hydrogen in a conduit at 40, constituting about 31.6% of the main hydrogen stream 36 passes through a first main fuel valve 50 and then passes through a coolant jacket 52 of engine nozzle 22 for cooling the nozzle. The hydrogen gasses discharge from the coolant nozzle jacket and heated to a temperature of about 600° R are conducted at 54 to the inlet of the liquid oxygen turbine 28 for driving same. Thus, the expander cycle engine 14 is operated by a turbine 28 driven by heated hydrogen at a much lower temperature rather than by combustion gasses used to drive the fuel turbine 26 of the staged combustion cycle 12, and which are generally at a much higher temperature of the order of about 1900° R.

The liquid hydrogen stream at 42 passes through another main fuel valve 56 and is conducted at 58 in heat exchange relation with the thrust chamber 21 and combustor 20, for cooling same, and the heated hydrogen gasses at a temperature of 229° R are introduced at 60 into the preburner 24.

Referring now to the expander topping cycle 14, oxidizer, specifically oxygen, at 62 is fed to a liquid oxygen boost pump 64 and the pressurized oxygen at 66 is introduced into the liquid oxygen pump 18 for further pressurization therein. Pressurized liquid oxygen discharged at 68 from pump 18 is divided into three streams. A minor stream of liquid oxygen at 70 is introduced into a liquid oxygen boost turbine 72 which is used to drive the boost pump 64, and the expanded discharged oxygen stream at 74 is mixed with the pressurized stream of liquid oxygen at 66 discharged from the liquid oxygen boost pump 64.

The second liquid oxygen stream at 76 is introduced into a liquid oxygen kick or boost pump 78, and the pressurized liquid oxygen discharged at 80 from pump 78, and at a pressure of about 9136 psi, which is substantially at the same pressure as the hydrogen stream 60, is introduced, together with such hydrogen stream, into the preburner 24. It is noted that the liquid oxygen turbine 28 drives the liquid oxygen kick pump 78, as well as the main liquid oxygen pump 18.

Thus, liquid oxygen at 80 passes through preburner oxygen valve 82, and liquid hydrogen at 60, both at high pressure, are introduced into the fuel-rich preburner 24. In the preburner, the hydrogen and oxygen are combusted and the combustion gasses discharged at 84 from the preburner are at high temperature of about 1600° R. These combustion gasses are introduced into the fuel turbine 26 for driving fuel pump 16, and the expanded combustion gasses are discharged at 86. These gasses are mixed at 88 with hydrogen gas discharged at 90 from the liquid oxygen turbine 28.

Since heated hydrogen at 54, from the nozzle coolant jacket 52, at moderate temperature, is used to drive the oxidizer turbine 28, the total enthalpy (flow rate × enthalpy per pound) of the hydrogen is comparable to the enthalpy of the liquid oxygen/hydrogen preburner combustion products at 84 because of the difference of heat capacity of the two gasses, so that sufficient oxidizer pump power can be derived with a fraction of the thrust chamber hydrogen coolant flow. The combustor hydrogen coolant flow at 60 and combusted with oxygen in the preburner 24 increases turbine flow rate and temperature of the combustion gasses to approximately 1600° R.

The mixture at 88 of expanded combustion gasses 86 from the fuel turbine 26 and expanded hydrogen gasses at 90 from the oxidizer turbine 28 are conducted at 96, at a temperature of about 1090° R and 3300 psi pressure, to the combustor 20 and thrust chamber 21. Also, the third stream of pressurized liquid oxygen 98 from the liquid oxygen pump 18 is passed through main oxygen valve 100 and into the combustor 20. Further, a portion of the liquid hydrogen 60 previously passed in heat exchange relation at 58 with the thrust chamber 21 and combustor 20, and at substantially the same pressure as the liquid oxygen at 98 and the mixed gasses at 96, is also introduced at 102 into the combustor 20 and thrust chamber 21. A flow orifice (not shown) allows for equalization of these pressures. Thus, the liquid oxygen and liquid hydrogen introduced into the combustor 20 together with the mixed gasses introduced at 96, are combusted therein, and such combustion gasses are passed into the nozzle 22 for expansion therein and delivery of thrust power.

It will be noted that a portion of the hydrogen stream 54 to the oxidizer turbine 28 is by-passed at 92 through an expansion valve 94 and mixed with the expanded oxidizer turbine exhaust at 90 to provide mixture ratio control trim, with the main oxidizer valve 100 providing the primary mixture ratio control function.

It is thus seen that the hybrid engine 10 of the invention is driven by a mixed cycle, one being an expander cycle as shown at 14 using low temperatures and the other one being a staged combustion cycle at 12 at a higher temperature. As compared to the conventional staged combustion cycle engine employing two turbines, the fuel turbine and the oxidizer turbine, both of which are driven by preburners generating combustion gasses at very high temperature of the order of about 1900 to 2000° R, the advantage of the concept of the present invention is that one of the turbines, requires non-combustion driving gasses, namely hydrogen gasses, at relatively low temperatures, and requires less power than the other turbine. Since the hydrogen gasses used to power one of the turbines are relatively cooler gasses this means that the turbine driven thereby will be exposed internally to lower temperatures, resulting in longer and more reliable life.

Figure 2:
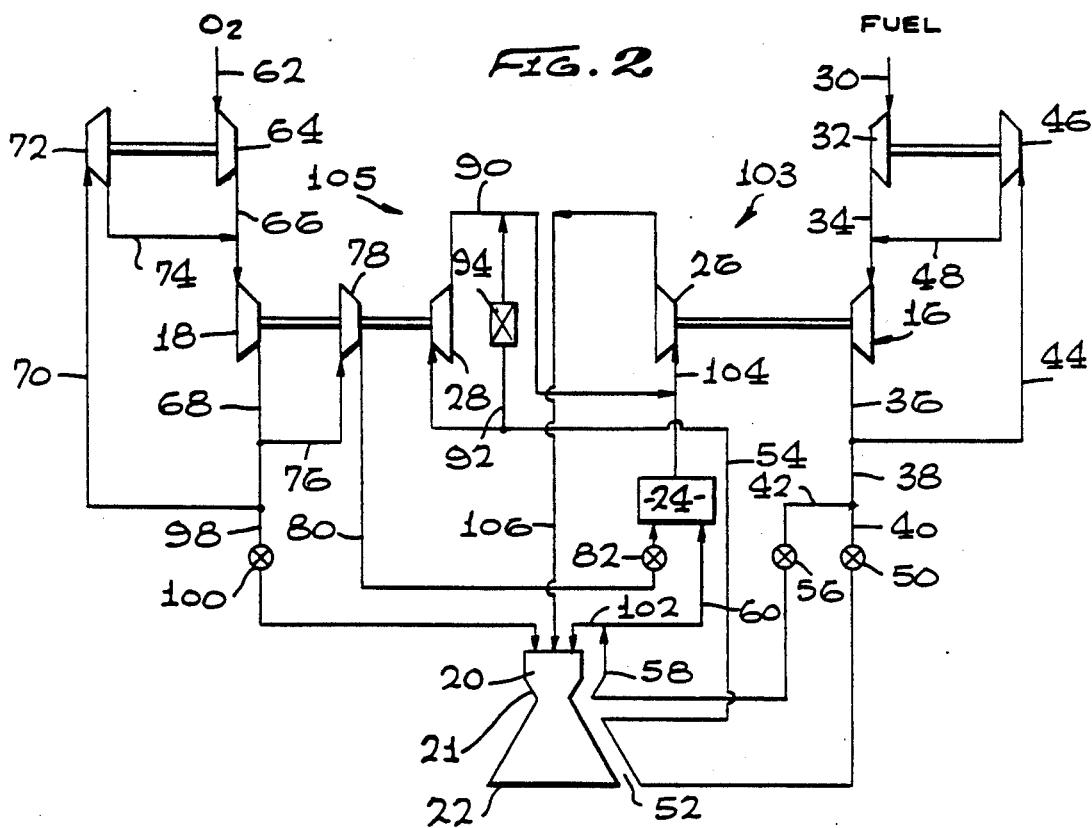
FIG. 2 is a schematic illustration of a second embodiment of the hybrid staged combustion-expander topping cycle engine of the invention, with preburner gas dilution.

FIG. 2 of the drawing illustrates schematically another embodiment of the hybrid engine of the invention employing a staged combustion cycle 103 in combination with an expander topping cycle 105, similar to 12 and 14 respectively, of the embodiment of FIG. 1, but employing preburner gas dilution. In the engine of FIG. 2, the components common to the components of FIG. 1 bear the same reference numbers as in FIG. 1.

In the embodiment of FIG. 2, instead of mixing the expanded hydrogen discharge gas at 90 from the liquid oxygen turbine 28, with the expanded combustion gas discharge at 86 from the fuel turbine 26, as in FIG. 1, the expanded hydrogen gas at 90 is mixed with the hot preburner combustion gasses at 84 to cool same prior to their introduction into the fuel turbine 26. Thus, a mixture of hydrogen gasses at about 420° R is mixed with preburner combustion gasses at about 1600° R to dilute same and form a gas mixture at 104 of a lower intermediate temperature of about 900° R which is introduced into the fuel turbine 26. The expanded mixture of combustion gasses and hydrogen from the fuel turbine 26, at a temperature of about 1100° R, is then introduced at 106 into the combustor 20 and the thrust chamber 21, together with the liquid oxygen at 98 and the liquid hydrogen at 102, for combustion to provide the mixture of drive gasses in the thrust chamber 21. Thus, while the introduction of the expanded hydrogen gasses at 90 into the preburner combustion gasses at 84 has the advantage of reducing the temperature in the fuel turbine 26, the expanded gasses therefrom at 106 and introduced into the combustor 20 are substantially at the same temperature as the mixture of gasses at 96 introduced into the combustor 20 in FIG. 1.

The lower temperatures at the main turbines, and collection manifolds in the hybrid staged combustion-expander topping cycle engine of the invention, provide the hybrid cycle engine with essentially equal reliability potential as the expander topping cycle per se. With proper control, the invention engine, particularly as exemplified in the embodiment of FIG. 2, can be started and brought to intermediate mainstage thrust levels in the expander cycle mode without any possibility of large temperature overshoots of the combustion gases at 104, as in the conventional staged combustion cycle. The hybrid cycle of the invention can then be staged into full thrust by opening the preburner oxidizer valve 82 to achieve full power, thus avoiding the steeper start transient flow gradients and preburner mixture ratio deviations.

It has been found that the hybrid expander-staged combustion cycle of the invention in its most reliable configuration, with preburner gas dilution as in FIG. 2, provides performance 8 seconds higher than the gas generator cycle and only 4 second lower than the staged combustion cycle. The hybrid cycle without dilution, as in FIG. 1, provides performance only 2 seconds lower than the staged combustion cycle. Typical engine perameters for the hybrid cycle without dilution illustrated in FIG. 1 and for the hybrid cycle with dilution illustrated in FIG. 2 are shown in the table below:

TABLE

| ENGINE PARAMETER | HYBRID WITHOUT DILUTION (FIG. 1) | HYBRID WITH DILUTION (FIG. 2) |
| --- | --- | --- |
| Fuel Turbine Inlet Temp, °R. | 1600 | 904 |
| Oxidizer Turbine Inlet Temp. °R. | 597 | 460 |
| Fuel Main Pump Outlet Pres., psia | 8380 | 9084 |
| Oxidizer Main Pump Outlet Pres., psia | 4593 | 3811 |
| Oxidizer Kick Pump Outlet Pres., psia | 9136 | 7664 |

From the foregoing, it is seen that the invention provides an improved hybrid staged combustion-expander topping cycle engine comprised of a mixed cycle including an expander cycle operating at low temperatures and a staged combustion cycle operating at a higher temperature, and reducing the overall temperatures of operation as well as the thermal stresses and cooling requirements of the oxidizer turbine, fuel turbine, and turbine exhaust collection manifolds.

It is to be understood that what has been described is merely illustrative of the principles of the invention and that numerous arrangements in accordance with this invention may be devised by one skilled in the art without departing from the spirit and scope thereof.

What is claimed is:

1. A hybrid staged combustion-expander topping cycle engine which comprises
a fuel turbine,
a fuel pump for pressurizing fuel driven by said fuel turbine,
an oxidizer turbine,
an oxidizer pump for pressurizing oxidizer driven by said oxidizer turbine,
a combustor and associated thrust chamber and expansion nozzle,
means for passing a portion of the pressurized fuel from said fuel pump in heat exchange relation with said nozzle for cooling same,
means for passing the resulting heated pressurized fuel to the inlet of said oxidizer turbine for driving same,
a preburner,
means for passing a portion of the pressurized oxidizer from said oxidizer pump to the inlet of said preburner,
means for passing another portion of the pressurized fuel from said fuel pump into heat exchange relation with said combustor and said thrust chamber, for cooling same, and then to the inlet of said preburner for combustion therein by said oxidizer,
means for passing the hot combustion gasses discharged from said preburner to the inlet of said fuel turbine for driving same,
means for passing another portion of the pressurized oxidizer from said oxidizer pump to said combustor, and
means for passing a portion of said another portion of the pressurized fuel following heat exchange with said combustor and said thrust chamber, to said combustor, for combustion therein by said oxidizer and for passage of the resulting combustion gasses through said thrust chamber and said expansion nozzle.

2. The engine of claim 1, wherein said fuel pump is a hydrogen pump and said oxygen pump is a liquid oxygen pump.

3. A hybrid staged combustion-expander topping cycle engine which comprises
- a hydrogen fuel turbine,
- a hydrogen fuel pump for pressurizing hydrogen driven by said fuel turbine,
- a liquid oxygen turbine,
- a liquid oxygen pump for pressurizing oxygen,
- a liquid oxygen kick pump associated with said liquid oxygen pump for further pressurizing a portion of said pressurized oxygen,
- said oxygen pumps being driven by said liquid oxygen turbine,
- a combustor including an associated thrust chamber and expansion nozzle,
- a coolant jacket on said nozzle,
- conduit means for passing a portion of pressurized liquid hydrogen from said fuel pump through said coolant jacket for cooling same and for heating said liquid hydrogen,
- conduit means for passing the resulting pressurized and heated liquid hydrogen to the inlet of said liquid oxygen turbine for driving same,
- a preburner,
- conduit means for passing the further pressurized liquid oxygen from said liquid oxygen kick pump to the inlet of said preburner,
- conduit means for passing a portion of the pressurized liquid hydrogen from said fuel pump in heat exchange relation with said thrust chamber and said combustor and then to the inlet of said preburner for combustion therein with said oxygen from said kick pump,
- conduit means for passing the hot combustion gases from said preburner to said hydrogen fuel turbine,
- conduit means for passing a portion of the pressurized liquid oxygen discharged from said liquid oxygen pump to said combustor,
- conduit means for passing a portion of the pressurized liquid oxygen discharged from said liquid oxygen pump to the inlet of said liquid oxygen kick pump,
- conduit means for passing a portion of the pressurized liquid hydrogen following heat exchange with said thrust chamber and said combustor, into said combustor for combustion therein by said liquid oxygen from said liquid oxygen pump, and
- conduit means for passing the hot expanded combustion gasses discharged from said hydrogen fuel turbine into said combustor.

4. The engine of claim 3, including means for combining the expanded hydrogen gasses discharged from said liquid oxygen turbine with the hot expanded combustion gasses discharged from said hydrogen fuel turbine, prior to passage of said combustion gasses into said combustor.

5. The engine of claim 3, including conduit means for introducing the expanded hydrogen gasses discharged from said liquid oxygen turbine into the hot combustion gasses discharged from said preburner prior to introduction thereof into said hydrogen fuel turbine.

6. The engine of claim 3, including conduit means for by-passing a portion of the expanded liquid oxygen discharge from said liquid oxygen pump to said liquid oxygen kick pump.

7. The engine of claim 3, including
- a hydrogen fuel boost pump,
- a fuel boost turbine for driving said hydrogen fuel boost pump,
- conduit means for passing the pressurized hydrogen fuel from said hydrogen fuel boost pump to the inlet of said hydrogen fuel pump,
- conduit means for passing a portion of pressurized hydrogen from said hydrogen fuel pump to the inlet of said fuel boost turbine for driving same, and
- conduit means for mixing expanded hydrogen from said fuel boost turbine with the pressurized hydrogen fuel from said hydrogen fuel boost pump.

8. The engine of claim 7, including
- a liquid oxygen boost pump,
- a liquid oxygen boost turbine for driving said liquid oxygen boost pump,
- conduit means for passing the pressurized liquid oxygen from said liquid oxygen boost pump to the inlet of said liquid oxygen pump,
- conduit means for passing a portion of the pressurized liquid oxygen from said liquid oxygen pump to the inlet of said liquid oxygen boost turbine, for driving same, and
- conduit means for mixing expanded oxygen from said liquid oxygen boost turbine with the pressurized liquid oxygen from said liquid oxygen boost pump.

9. A hybrid staged combustion-expander topping cycle engine which comprises
- a fuel turbine,
- a fuel pump for pressurizing fuel driven by said fuel turbine,
- an oxidizer turbine,
- an oxidizer pump for pressurizing oxidizer driven by said oxidizer turbine,
- a combustor and associated thrust chamber and expansion nozzle,
- means for passing a portion of the pressurized fuel from said fuel pump in heat exchange relation with said nozzle for cooling same,
- means for passing the resulting heated pressurized fuel to the inlet of said oxidizer turbine for driving same,
- a preburner,
- means for passing a portion of the pressurized oxidizer from said oxidizer pump to the inlet of said preburner,
- means for passing another portion of the pressurized fuel from said fuel pump to the inlet of said preburner for combustion therein by said oxidizer,
- means for passing the hot combustion gasses discharged from said preburner to the inlet of said fuel turbine for driving same,
- means for passing another portion of the pressurized oxidizer from said oxidizer pump to said combustor,
- means for passing a third portion of the pressurized fuel to said combustor, for combustion therein by said oxidizer and for passage of the resulting combustion gasses through said thrust chamber said expansion nozzle, and
- means for combining the hot combustion gasses discharged from said fuel turbine with the fuel gas discharged from said oxidizer turbine, and means for passing the combined gasses into said combustor.

10. A hybrid staged combustion-expander topping cycle engine which comprises
- a fuel turbine, a fuel pump for pressurizing fuel driven by said fuel turbine, an oxidizer turbine, an oxidizer pump for pressurizing oxidizer driven by said oxidizer turbine, a combustor and associated thrust chamber and expansion nozzle, means for passing a portion of the pressurized fuel from said fuel pump in heat exchange relation with said nozzle for cooling same, means for passing the resulting heated pressurized fuel to the inlet of said oxidizer turbine for driving same, a preburner, means for passing a portion of the pressurized oxidizer from said oxidizer pump to the inlet of said preburner, means for passing another portion of the pressurized fuel from said fuel pump to the inlet of said preburner for combustion therein by said oxidizer, means for passing the hot combustion gasses discharged from said preburner to the inlet of said fuel turbine for driving same, means for mixing hot fuel gas discharged from said oxidizer turbine with the hot combustion gasses upstream from said preburner and diluting same prior to passing said combustion gasses to said fuel turbine, means for passing the mixture of combustion gasses and fuel gas discharged from the fuel turbine into said combustor, means for passing another portion of the pressurized oxidizer from said oxidizer pump to said combustor, and means for passing a third portion of the pressurized fuel to said combustor, for combustion therein by said oxidizer and for passage of the resulting combustion gasses through said thrust chamber and said expansion nozzle.

11. A hybrid staged combustion-expander topping cycle engine which comprises a fuel turbine, a fuel pump for pressurizing fuel driven by said fuel turbine, an oxidizer turbine, an oxidizer pump for pressurizing oxidizer driven by said oxidizer turbine, a combustor and associated thrust chamber and expansion nozzle, means for passing a portion of the pressurized fuel from said fuel pump in heat exchange relation with said nozzle for cooling same, means for passing the resulting heated pressurized fuel to the inlet of said oxidizer turbine for driving same, a preburner, means for passing a portion of the pressurized oxidizer from said oxidizer pump to the inlet of said preburner, means for passing another portion of the pressurized fuel from said fuel pump to the inlet of said preburner for combustion therein by said oxidizer, means for passing the hot combustion gasses discharged from said preburner to the inlet of said fuel turbine for driving same, means for passing another portion of the pressurized oxidizer from said oxidizer pump to said combustor, means for passing a third portion of the pressurized fuel into heat exchange relation with said combustor and said thrust chamber, for cooling same, and means for passing the resulting third portion of the pressurized fuel to said combustor, for combustion therein by said oxidizer and for passage of the resulting combustion gasses through said thrust chamber and said expansion nozzle.

12. A hybrid staged combustion-expander topping cycle engine which comprises a fuel turbine, a fuel pump for pressurizing fuel driven by said fuel turbine, an oxidizer turbine, an oxidizer pump for pressurizing oxidizer driven by said oxidizer turbine, a combustor and associated thrust chamber and expansion nozzle, means for passing a portion of the pressurized fuel from said fuel pump in heat exchange relation with said nozzle for cooling same, means for passing the resulting heated pressurized fuel to the inlet of said oxidizer turbine for driving same, a preburner, means for passing a portion of the pressurized oxidizer from said oxidizer pump to the inlet of said preburner, an oxidizer boost pump driven by said oxidizer turbine, for increasing the pressure of said portion of the pressurized oxidizer passed to the inlet of said preburner, means for passing another portion of the pressurized fuel from said fuel pump to the inlet of said preburner for combustion therein by said oxidizer, means for passing the hot combustion gasses discharged from said preburner to the inlet of said fuel turbine for driving same, means for passing another portion of the pressurized oxidizer from said oxidizer pump to said combustor, and means for passing a third portion of the pressurized fuel to said combustor, for combustion therein by said oxidizer and for passage of the resulting combustion gasses through said thrust chamber and said expansion nozzle.

* * * * *